US008338737B2

(12) United States Patent
Catalano et al.

(10) Patent No.: US 8,338,737 B2
(45) Date of Patent: Dec. 25, 2012

(54) COMPUTER HOUSING

(75) Inventors: Carlo Catalano, Santa Clara, CA (US);
Derrick Jue, Cupertino, CA (US); Brian Miehm, Santa Clara, CA (US);
Takahiro Oshima, Tokyo (JP);
Masashige Tatebe, Kakogawa (JP)

(73) Assignee: Apple Inc., Cupertino, CA (US)

( * ) Notice: Subject to any disclaimer, the term of this patent is extended or adjusted under 35 U.S.C. 154(b) by 658 days.

(21) Appl. No.: 12/571,122

(22) Filed: Sep. 30, 2009

(65) Prior Publication Data
US 2011/0073575 A1    Mar. 31, 2011

(51) Int. Cl.
*B23K 9/10*    (2006.01)
(52) U.S. Cl. ............... 219/86.22; 219/78.01; 219/78.13; 228/262.1
(58) Field of Classification Search .................. None
See application file for complete search history.

(56) References Cited

U.S. PATENT DOCUMENTS

| | | | | |
|---|---|---|---|---|
| 3,786,559 | A | * | 1/1974 | Smith .............................. 228/115 |
| 3,937,387 | A | | 2/1976 | Fletcher et al. |
| 4,760,240 | A | | 7/1988 | Iikawa et al. |
| 5,619,823 | A | * | 4/1997 | Ruff et al. ........................ 49/504 |
| 5,708,895 | A | | 1/1998 | Ando et al. |
| 6,125,029 | A | | 9/2000 | Sasaki et al. |
| 6,437,974 | B1 | | 8/2002 | Liu |
| 6,574,096 | B1 | | 6/2003 | Difonzo et al. |
| 6,626,303 | B1 | | 9/2003 | Moodie |
| 7,399,083 | B2 | | 7/2008 | Bailey et al. |
| 2003/0161142 | A1 | | 8/2003 | Kotivsky |
| 2004/0232291 | A1 | | 11/2004 | Carnevali |
| 2005/0284993 | A1 | | 12/2005 | Ternus et al. |
| 2007/0132910 | A1 | | 6/2007 | Liao |
| 2007/0291901 | A1 | | 12/2007 | Warburton |
| 2008/0063218 | A1 | | 3/2008 | Weber et al. |
| 2008/0247750 | A1 | | 10/2008 | Law et al. |

(Continued)

FOREIGN PATENT DOCUMENTS
JP    2007-3698    1/2007
(Continued)

OTHER PUBLICATIONS

Final Office Action for U.S. Appl. No. 11/829,845 dated Sep. 18, 2009.

(Continued)

*Primary Examiner* — Benjamin Sandvik
*Assistant Examiner* — Scott R Wilson
(74) *Attorney, Agent, or Firm* — Womble Carlyle Sandridge & Rice LLP

(57) ABSTRACT

A visually seamless method of joining a first piece of metal and a second piece of metal is described. The first piece of metal is placed in contact with an edge of the second piece of metal. In some embodiments, the edge includes a sacrificial lip. The first piece of metal forming a junction area with the edge of the second piece of metal, applying a forging force to the first piece of metal, the forging force having an effect of creating an extremely tight fit up between the first and the second pieces of metal, welding the first and the second pieces to form an assembly and forming a cosmetically enhancing protective layer on the surface of the assembly, the protective layer obscuring any visible artifacts on the surface of the assembly, the obscured visible artifacts including any discoloration or discontinuity created by the laser welding.

17 Claims, 13 Drawing Sheets

U.S. PATENT DOCUMENTS

| | | |
|---|---|---|
| 2009/0040703 A1 | 2/2009 | Gotham et al. |
| 2009/0244853 A1 | 10/2009 | Takahashi |
| 2009/0246934 A1 | 10/2009 | Yamazaki et al. |
| 2009/0266621 A1 | 10/2009 | Hung et al. |
| 2010/0225612 A1 | 9/2010 | Ishizaki |

FOREIGN PATENT DOCUMENTS

| | | |
|---|---|---|
| JP | 2008-137074 | 6/2008 |

OTHER PUBLICATIONS

Final Office Action for U.S. Appl. No. 11/829,845 dated Jul. 20, 2011.
Notice of Allowance for U.S. Appl. No. 12/570,972 dated Feb. 28, 2011.
Office Action for U.S. Appl. No. 11/829,845 dated Mar. 13, 2009.
Office Action for U.S. Appl. No. 11/829,845 dated Apr. 9, 2010.
Office Action for U.S. Appl. No. 11/829,845 dated Jul. 16, 2010.
Office Action for U.S. Appl. No. 11/829,845 dated Feb. 4, 2011.
Office Action for U.S. Appl. No. 11/829,845 dated Mar. 1, 2012.
U.S. Appl. No. 11/829,845, filed Jul. 27, 2007.
U.S. Appl. No. 12/570,972, filed Sep. 30, 2009.
U.S. Appl. No. 13/107,808, filed May 13, 2011.

* cited by examiner

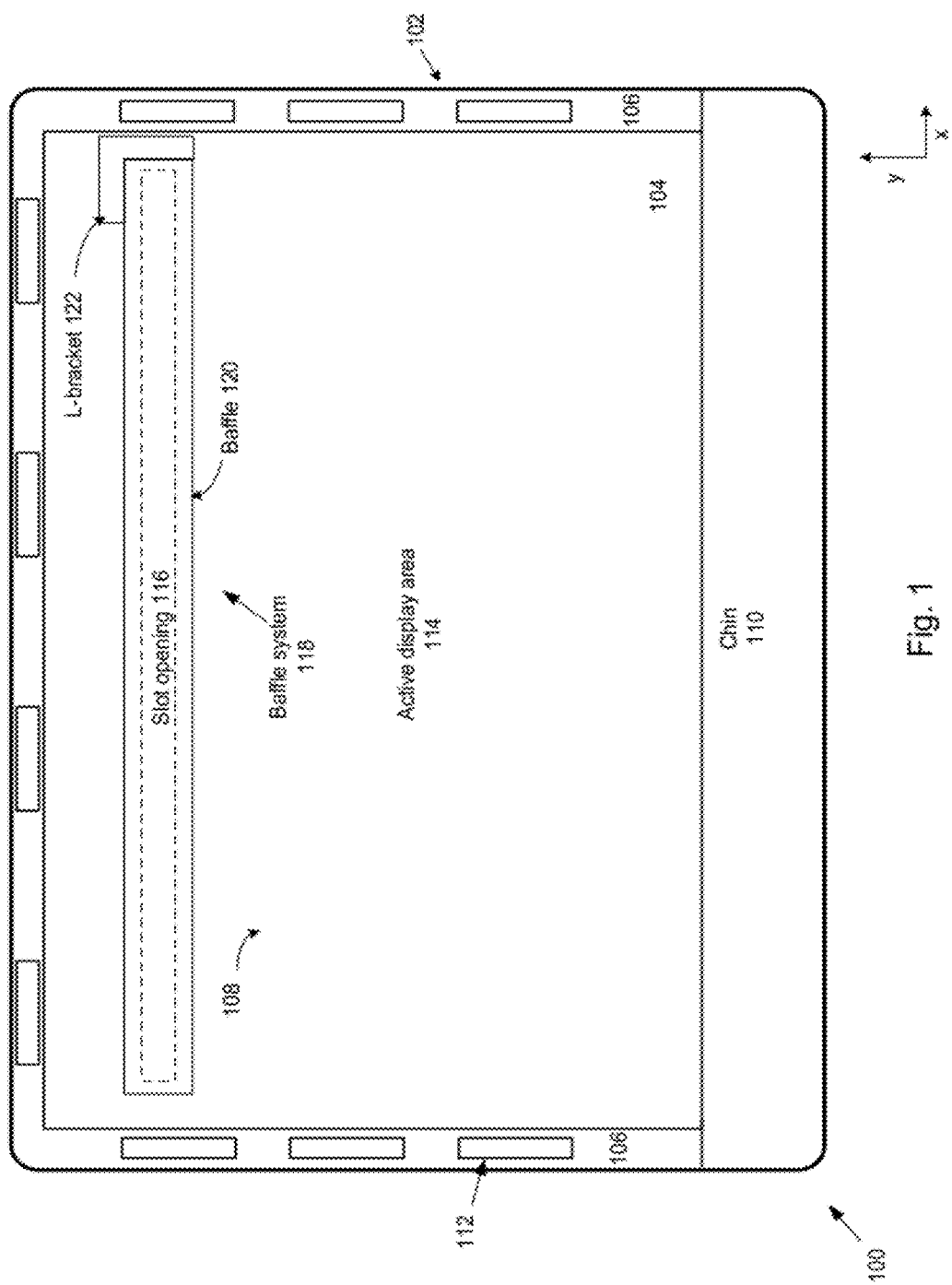

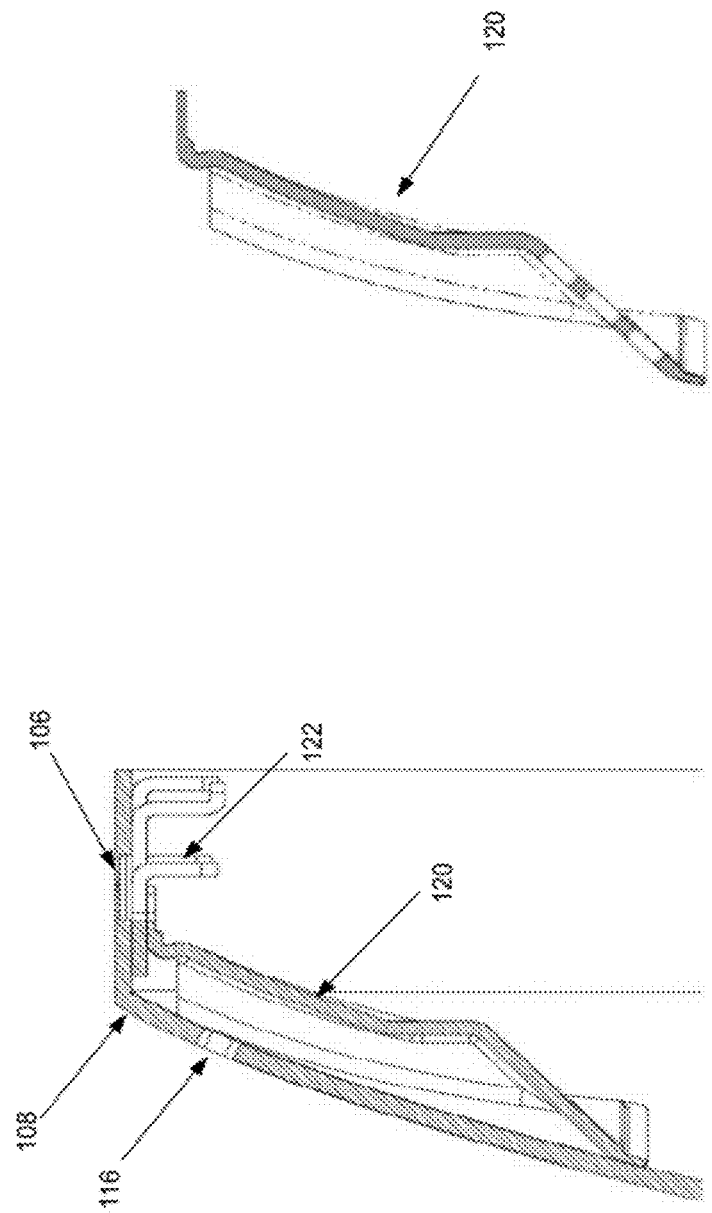

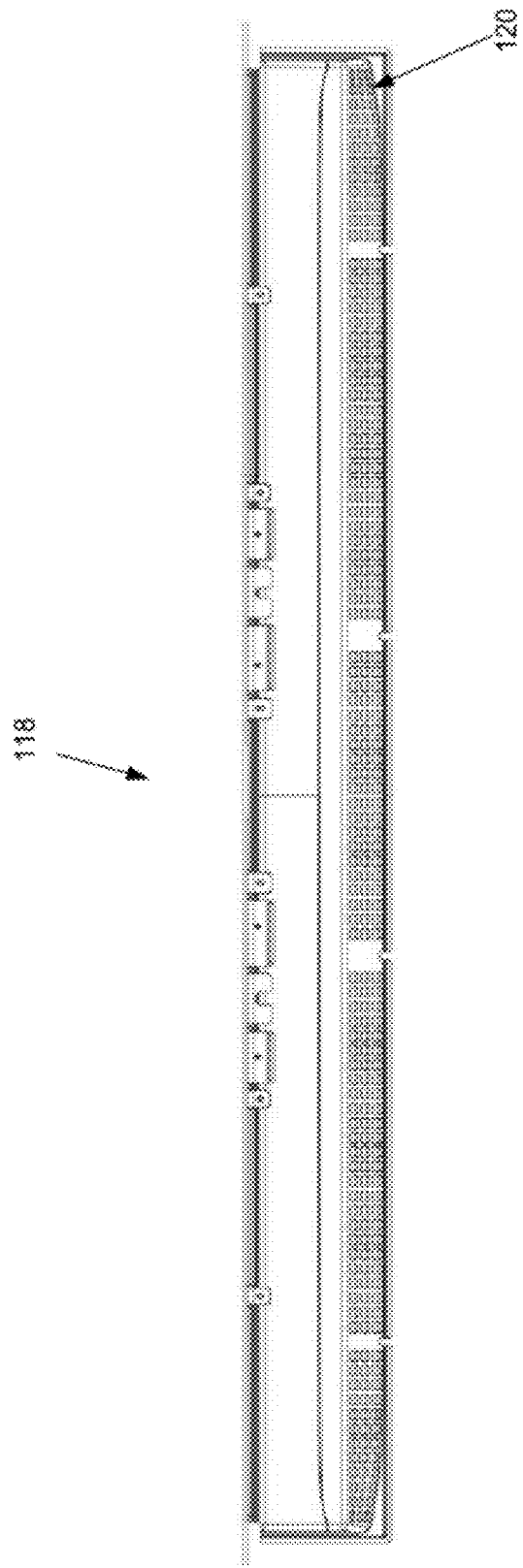

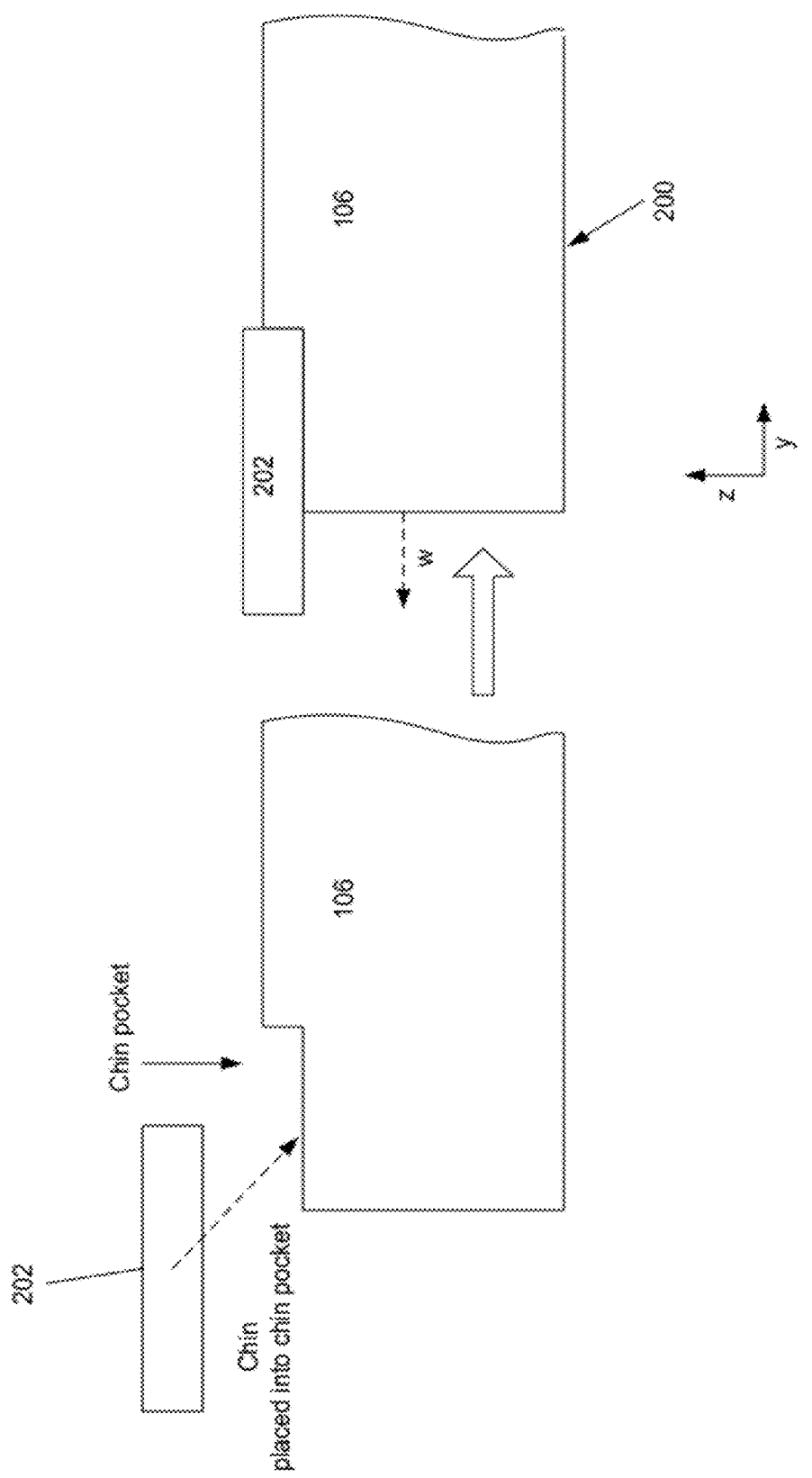

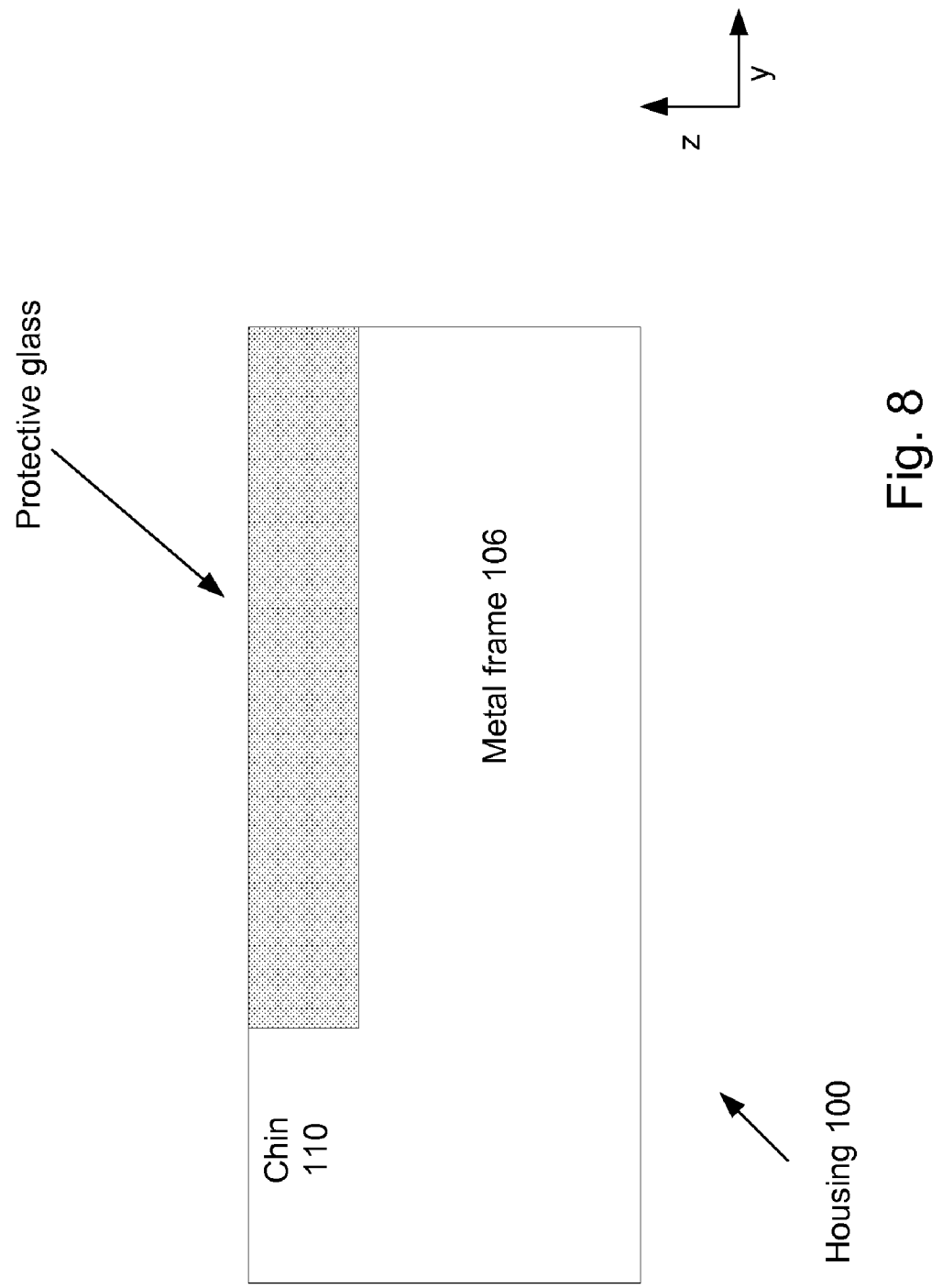

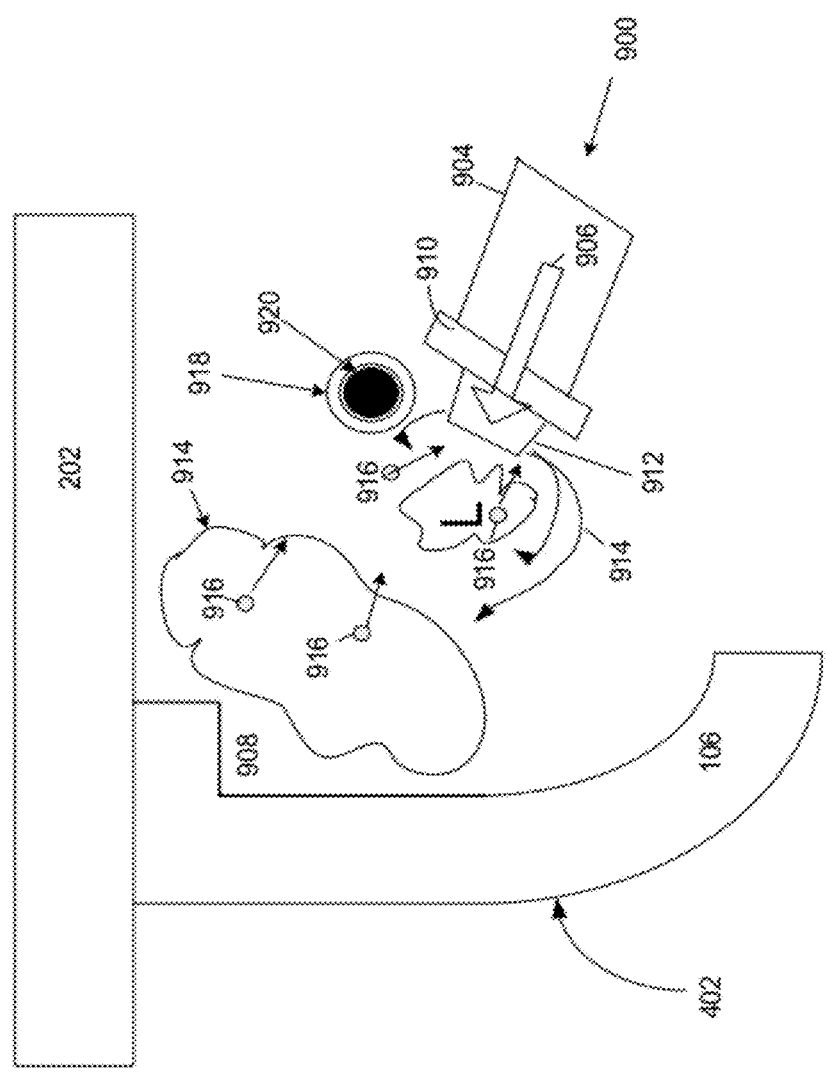

COMPUTER HOUSING

CROSS REFERENCE TO RELATED APPLICATIONS

This U.S. patent application is related to co-pending U.S. patent application Ser. No. 12/570,972, filed concurrently herewith entitled, "COVER GLASS TO HOUSING INTERFACE SYSTEM" by Gotham et al. which is incorporated by reference in its entirety for all purposes.

BACKGROUND OF THE INVENTION

1. Field of the Invention

This application relates generally to improving the aesthetic look and feel of products formed by welding at least two pieces of metal together. Such products can include, for example, furniture, automobiles, and housings suitable for accommodating electronic devices such a computers and consumer electronics. In particular, this application describes welding operations that create visually seamless welds.

2. Description of the Related Art

The art of joining at least two metal pieces together includes such processes as welding in its many forms. However, most applications whereby separate pieces of metal are joined are focused more on the strength of the bond and less on the appearance of the bond. If, however, the appearance of the bond is important, it will often be precisely welded and then painted (such as a bicycle frame), precisely welded, ground down, and then painted (such as a car frame). Currently, there is trend in consumer electronic products (such as computers and hand held devices) to use materials that are both strong, resilient and aesthetically pleasing. One such material is aluminum that has the ability to be formed into any number of suitable shapes, anodized to provide a protective coat that is also pleasing to the eye, and provide an overall aesthetically pleasing experience to the user.

However, when using aluminum to create enclosures, such as a housing for a computer assembly, several separate pieces of aluminum must be joined together. Some of these joined pieces are clearly visible to a user of the computer. Any visible artifact (such as a noticeable seam, variation in color, variation in surface texture) can distract from the overall aesthetic appearance of the consumer product. Clearly these visible artifacts are not acceptable when a computer manufacturer places a high value on both the strength of the bond and the appearance of the housing.

Although the prior art effectively discloses any number of techniques for joining together at least two metal pieces, there is still a need for a metal joining technique that provides a strong as well as apparently seamless metal joint.

SUMMARY OF THE DESCRIBED EMBODIMENTS

This application describes a number of embodiments that relate to systems, methods, and apparatus for creating an apparently seamless joint between two metal pieces. In particular, the embodiments relate to various techniques for forming apparently seamless joints in a metal such as those used to create a housing formed of, for example, aluminum suitable for enclosing and supporting electronic components.

A method of joining a first piece of metal and a second piece of metal is described. The method can be carried out by performing at least the following operations. Placing the first piece of metal in contact with an edge of the second piece of metal. In some embodiments the edge of the second piece of metal includes a sacrificial lip. In any case, the edge of the second piece of metal and the first piece of metal forming a junction area, applying a forging force to the first piece of metal, the forging force having an effect of creating an extremely tight fit up between the first and the second pieces of metal at the junction area, forming an assembly by welding the junction area to form a weld, the weld being essentially invisible to an observer, the assembly including the joined first and second pieces of metal, and forming a cosmetically enhancing protective layer on the surface of the assembly, the protective layer obscuring any visible artifacts on the surface of the assembly.

In one aspect, the first piece of metal can take the form of a metal bar and the second piece of metal can take the form of a metal housing each being formed of aluminum joined to form a computer housing. The protective layer can be formed by anodizing the surfaces of the computer housing and the welding can be laser welding.

A computer housing is disclosed. The computer housing formed by at least a metal frame and a metal bar joined together at an essentially invisible laser weld joint. The essentially invisible weld formed by fixturing the metal frame and placing the metal bar onto the fixtured metal frame of the metal bar and the metal frame forming a junction region, applying a forging force onto the metal bar that causes at least a portion of the metal bar in contact with the metal housing at the junction region to physically deform in relation to the metal frame, forming the computer housing by welding the junction region, and forming a protective layer on the computer housing, the protective layer hiding from view surface defects caused by the welding.

A method of laser welding a first and a second piece of metal together in a small enclosed area is described. The method can be carried out by carrying out at least the following operations. Providing the laser welding apparatus, the laser welding apparatus having at least a protective cover glass, in the absence of a cross jet flow, providing an atmosphere of inert gas in the vicinity of a laser target, and firing the laser at the laser target, wherein the absence of the cross jet flow preserves the inert atmosphere of inert gas in the vicinity of the laser target thereby substantially reducing an amount of laser caused debris from reaching the cover glass, thereby extending a useful life of the cover glass.

Computer readable medium for encoding computer program code executable by a processor, the processor controlling a manufacturing operation for joining a first piece of metal and a second piece of metal is disclosed. The computer readable medium including at least computer code for placing the first piece of metal in contact with an edge of the second piece of metal forming a junction area, computer code for applying a forging force to the first piece of metal, the forging force having an effect of creating an extremely tight fit up between the first and the second pieces of metal, computer code for forming an assembly by welding the junction area to form a weld, the weld being essentially invisible to an observer, the assembly including the joined first and second pieces of metal, and computer code for forming a cosmetically enhancing protective layer on the surface of the assembly, the protective layer obscuring any visible artifacts on the surface of the assembly, the obscured visible artifacts including any discoloration or discontinuity created by the welding.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 1 shows a front view of a finished housing suitable for enclosing and supporting a computer/display assembly in accordance with the described embodiments.

FIGS. 2B and 2C show representative embodiments of a baffle system.

FIG. 3 shows a representative bar pocket used to align a metal bar to a metal frame in accordance with the described embodiments.

FIGS. 7 and 8 show results of representative finishing operations in accordance with the described embodiments.

FIGS. 9A-9B show representative laser welding assembly in accordance with the described embodiments.

DETAILED DESCRIPTION OF SELECTED EMBODIMENTS

Figure 2A:
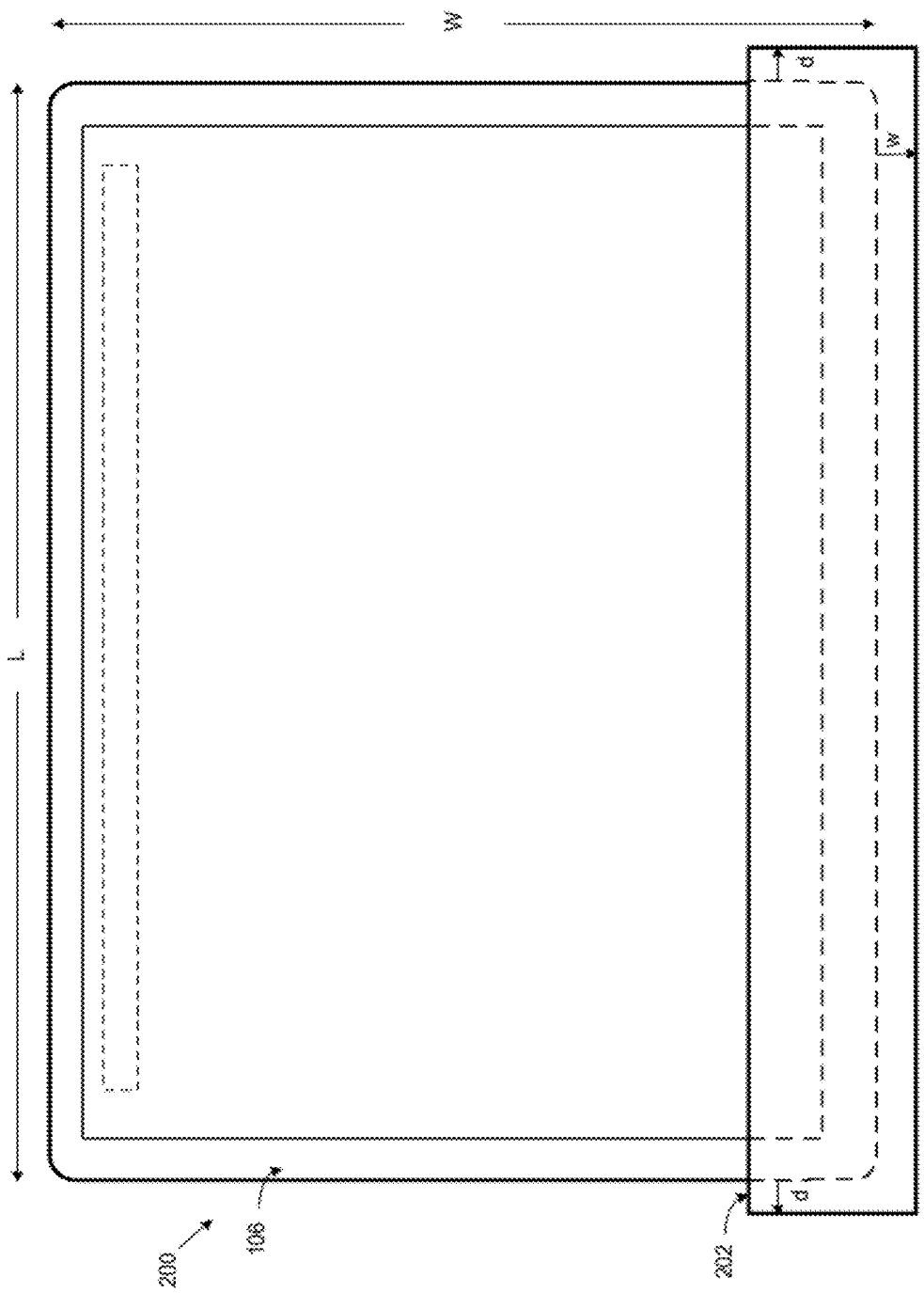
FIG. 2A shows a front view of an initial stage in the fabrication of housing in accordance with the described embodiments.

Reference will now be made in detail to selected embodiments an example of which is illustrated in the accompanying drawings. It should be understood that the described embodiments are not intended to be limited to one preferred embodiment. To the contrary, it is intended to cover alternatives, modifications, and equivalents as can be included within the spirit and scope of defined by the appended claims.

The disclosed embodiments relate to seamlessly joining at least two pieces of metal together. In one embodiment, the joined pieces of metal can form part of a computer housing. The computer housing being suitable for enclosing and supporting a computer/display assembly and formed of aluminum. The computer housing can be formed of at least two aluminum parts that can include at least a first and a second piece of metal. The first and second pieces of metal can take the form of a housing body and a metal bar. Prior to the metal bar and the housing body being joined, a baffle formed of substantially the same material as the housing body can be spot welded to an inside surface of the housing body. The baffle can be configured to substantially cover an opening in the housing body. The baffle can be used to obscure a view through the opening from the external environment of a computer assembly enclosed within the computer housing. The baffle can also help to deflect from around the opening any forces or loads applied to the housing body.

The housing body and the metal bar can be welded together using what appears to an observer to be a seamless weld joint. By seamless weld joint, it is meant that to the observer, there is no apparent joint or other discontinuity between the housing body and the metal bar. In this way, the joined pieces of metal appear to be single and unified. The first and the second pieces of metal can be laser welded together by applying a forging force to the metal bar in relation to the housing body. The forging force can mechanically deform the metal bar with respect to the housing body. The forging force can also cause at least some diffusion bonding to occur between the metal bar and the portion of the body in contact with the metal bar. The forging force and subsequent deformation of the metal bar to the housing body can have the effect of providing an extremely tight fit up between the metal bar and housing body.

It should be noted that there are at least two types of lasers that can be used for welding operation: gas, such as $CO_2$ and solid state laser both of which can operate in the infrared region of the electromagnetic radiation spectrum that is invisible to the human eye. The solid state laser can include lasers having a gain medium formed of glass doped with optically active ions such as neodymium (Nd) or ytterbium (Yb) that can provide its primary light output in the near-infrared at a wavelength of 1.06 microns at laser energies up to about 8000 watts. Laser energy from solid state lasers having a wavelength of 1.06 microns can be readily absorbed by conductive materials, such as metals, that can typically have a typical reflectance of about 20 to 30 percent. Moreover, the wavelengths represented by 1.06 microns can permit the use of standard optics to achieve focused spot sizes as small as 0.001" in diameter. In this way, solid-state lasers can be more precise (due to higher quality optics) and more versatile due to beam delivery than gas lasers. For example, a "throttled down" solid state laser can be used to tack weld the baffle (and associated L bracket) to the housing body.

In order to join two pieces of metal, laser welding creates what is referred to as a "keyhole". The term "keyhole" is a descriptive term that refers to the plasma and vapor filled keyhole shaped volume formed when a high intensity laser beam impinges on the surface of most metals. This keyhole is then traversed through the joint area leaving a (high) aspect ratio weld of solidified material. A fully developed keyhole can trap almost all of the incident laser power and convert it into heat. Some of the light is absorbed by the vapor, while the rest bounces around inside the channel and delivers energy with each reflection creating a molten mass that can cool to form what is referred to as the weld nugget, or simply nugget. The keyhole allows lasers to produce welds that are deep and narrow, because power is delivered to the workpiece through the vapor channel. The aspect ratio (depth/width) of keyhole laser welds can be as high as 8:1 but in this case, is closer to 1:1.125.

Due to the aspect ratio inherent with keyholing, the portion of the body placed in contact with the metal bar can include a sacrificial lip of aluminum. The sacrificial lip, although substantially straight when initially formed, can become somewhat curved as a result of the applied forging force. In this way, the sacrificial lip can have an additional cross-section width of about 10% to about 50% of the original width of the housing body. A substantial portion of the nugget can then be formed to include a substantial portion of the sacrificial lip. As the laser beam moves along the target area (including the sacrificial lip), the molten metal fills in behind the keyhole and solidifies to form the weld. In this way, the sacrificial lip can greatly reduce the possibility that any post weld finishing operations expose the metal left behind in the keyhole. After the welding is completed, a protective and cosmetic layer can be formed on at least a portion of the housing in the vicinity of the weld. This protective layer can be an aluminum oxide layer formed during an anodizing process. In particular embodiments, a surface cleaning operation using abrasive material can be carried out prior to the anodizing whereas in other embodiments an ultrasonic cleaner can be used that removes contaminants via "cavitation". The cleaning operation both cleans the surface of contaminants and such but also helps to obscure any visible artifacts, such as discoloring.

Another aspect of the described embodiments relates to the laser welding apparatus used to laser weld the body and the metal bar. The laser weld assembly includes a laser configured to provide laser energy to the workpiece. The laser includes a protective cover glass used to protect the laser from metallic vapor or liquid metal generated by the laser welding process. For those applications where the welding optics are in close proximity to a weld bead, a cross jet provides a jet of high pressure gas that is used to deflect any oncoming metal generated by the lasing of the workpiece from landing on the cover glass or the laser optics. Any such contamination on the cover glass can adversely affect the laser welding operation due to, for example, reducing the amount of laser energy that can be delivered to the workpiece. However, it has been discovered that due to the close proximity of the laser target area and the laser itself, the flow of high pressure gas from the cross jet nozzle creates a region of relatively lower pressure directly in front of the laser optics that tends to deplete the inert gas atmosphere in the target area. This depletion can be caused by bleeding off gas from that gas already deposited in the target area in addition to gas bled off directly from the nozzle(s) supplying the inert gas in the first place. The region of relatively lower pressure can also funnel and accelerate spatter debris directly from the laser target area to the optics. Therefore, contrary to convention wisdom, it has been discovered that by turning off completely the cross jet flow or not providing the capability of the cross jet flow in the first place, the low pressure area is eliminated thereby preserving the inert atmosphere in the vicinity of the laser target resulting in longer than expected useful lifetime of the cover glass.

The embodiments described herein can be illustrated by the figures Embodiments are discussed below with reference to FIGS. 1-10. However, those skilled in the art will readily appreciate that the detailed description given herein with respect to these figures is for explanatory purposes and extends beyond these limited embodiments.

FIG. 1 shows a front view of finished housing 100 suitable for enclosing and supporting a computer/display assembly in accordance with the described embodiments. Housing 100 can include rear cover 102 having region 104 enclosed by metal frame 106 and supporting rear wall 108. Region 104 can define a volume having a size suitable for accommodating the computer/display assembly. The computer/display assembly can be supported by metal frame 106 and protected from the external environment by rear wall 108. In the disclosed embodiment, rear wall 108 can be formed of rugged material such as plastic or metal such as aluminum as can metal frame 106. Metal frame 106 can support the computer/display assembly and a protective cover glass (not shown). Protective cover glass can be configured to cover essentially the entire front facing portion of housing 100 (except for that portion occupied by chin 110). A number of protective glass restraint structures 112 attached to metal frame 106 can help keep the protective cover glass from detaching and falling away from metal frame 106. The aesthetic look and feel of the finished product can be enhanced using a masking area that can obscure restraint structures 112 as well as to focus a user's eye on active display area 114. Chin 110 can provide a platform on which protective cover glass can rest.

Slot shaped opening 116 (also referred to as top vent slot) formed in rear portion 108 (visible in a rear view of housing 100) can be used to provide a conduit for the exchange of air between enclosure 104 and the external environment. This exchange of air can facilitate the cooling of the computer/display assembly within enclosure 104. However, in order to prevent a user from actually viewing the computer assembly (and any other internal components), baffle system 118 can be attached to housing 100. Baffle system 118 can also be configured to direct the airflow that passes through slot opening 116 from the external environment to specific areas within enclosure 104. In the described embodiment, baffle system 118 can include baffle 120 and L bracket 122. Baffle system 118 can be attached to housing 100 by, for example, tack welding one portion of baffle 120 to an interior surface of enclosure 104 and another portion to L bracket 122. L bracket 122, in turn, can be attached to the interior surface of enclosure 104. (FIGS. 2A and 2B show representative embodiments of baffle system 118).

One drawback to forming slot opening 116 in rear wall 108 is that the removal of material to form slot opening 116 can result in a localized area of a reduced structural integrity simply due to the fact that a void has been opened in an otherwise continuous rear wall 108. This void can result in mechanical deformation of rear wall 108 in proximity to slot opening 116 (referred to as slot misalignment). Slot misalignment can result when a force applied to housing 110 causes one side of slot opening 116 to displace relative to the other side of slot opening 116 (resembling an overbite or in some cases an underbite). In addition to detracting from the overall appearance of housing 100, such mechanical deformation of rear wall 108 can seriously affect dimensional and structural integrity of housing 100.

However, baffle system 118 can essentially eliminate any stress related mechanical deformations of rear wall 108 in the vicinity of slot 116 by deflecting any force applied to housing 100 effectively bypassing slot opening 116. For example, if a force is applied to a lower portion of housing 100, the force will be transmitted through rear wall 108 to and through baffle 120 to L bracket 122 and ultimately to that portion of housing 100 joined to L bracket 122 bypassing slot opening 116. In this way, slot opening 116 can be formed prior to operations that require that a restraining force be applied to housing 100. Such operations can include, for example, laser welding and CNC machining. In this way, substantial savings in both fabrication time and expense can be realized since slot opening 116 can be formed in the same set up as the fabrication of rear wall 108.

FIGS. 2-10 illustrate a number of embodiments used in the fabrication of housing 100. More particularly, the joining of metal frame 106 and rectangular metal bar 202 to form apparently seamless joining of chin 110 and frame 106. For the remainder of this discussion, the metal used to form rectangular metal bar 202 is aluminum and will hereinafter be referred to as bar 202.

FIG. 2A shows a front view of an initial stage in the fabrication of housing 100 showing assembly 200 with bar 202 secured to metal frame 106 (note that the obscured portion of metal frame 106 is shown in dotted lines). In the following discussion, bar 202 can be considered to be the precursor component of chin 110 shown in FIG. 1. In order to accommodate post weld finishing operations, bar 202 can have length L+2d and width W+w. The post weld finishing operations can be carried out using CNC machining techniques in order to provide an aesthetically pleasing look and feel to finished housing 100. For example, bar 202 can have its length reduced by about at least amount "d" on both sides and its width reduced by about least amount "w". In order to assure that bar 202 does not move once it is put into place on frame 106, bar 202 can be secured to metal frame 106. Bar 202 can be secured to metal frame 106 using, for example, laser tack welds at various locations at the interior junction of bar 202 and frame 106. Since the laser tack welds are only intended to keep bar 202 from moving, the laser tack welds can be formed using a throttled back solid state laser.

It should be noted that frame 106 can accommodate bar 202 by way of a recess portion referred to as a bar pocket shown in some detail in FIG. 3. Bar pocket can be used to align bar 202 in relation to metal frame 106. Once bar 202 is in place within the bar pocket, the combination of bar 202 and metal frame 106 (taken together can be referred to as assembly 200 discussed below) can be secured into a fixture for subsequent processing.

Figure 4:
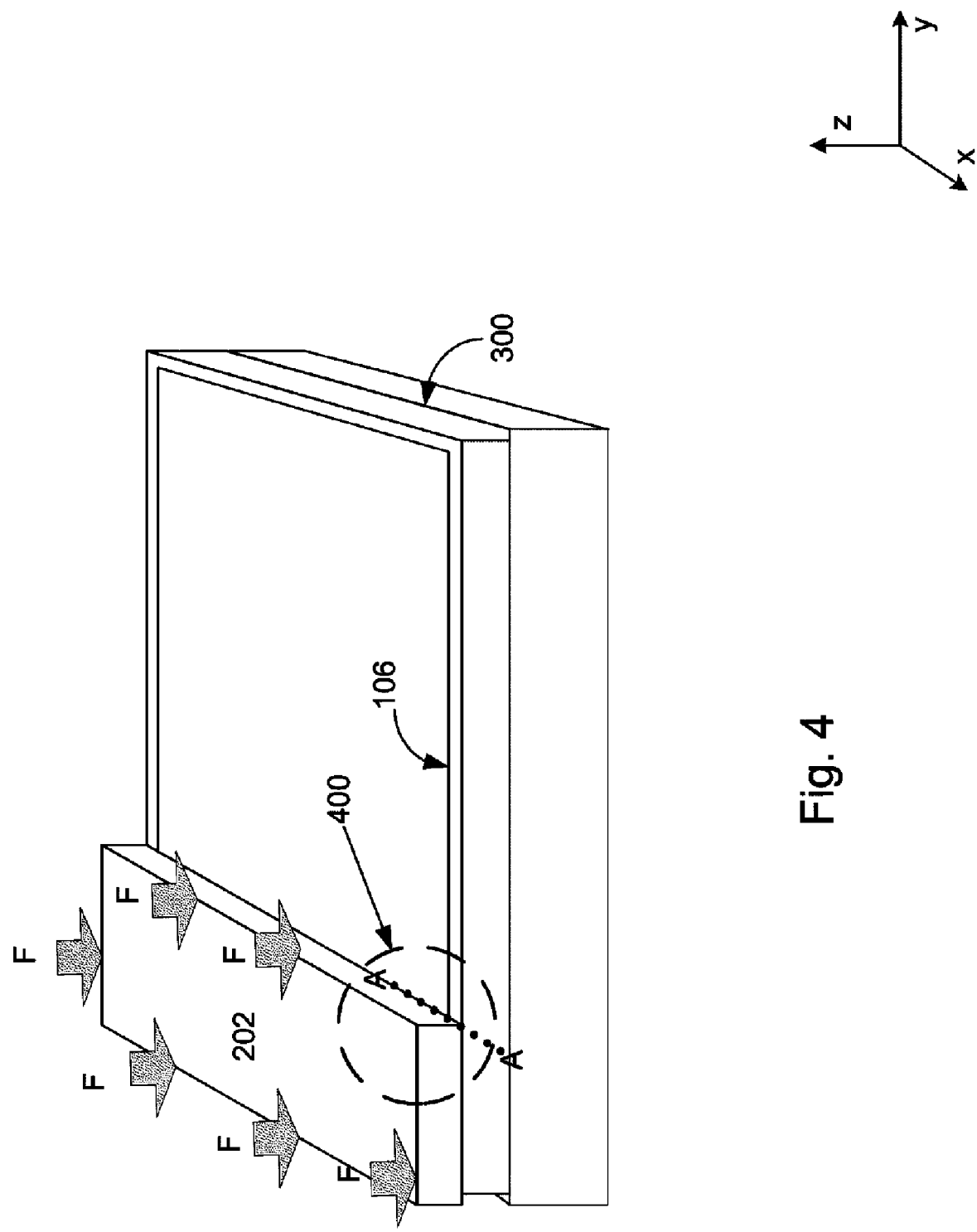
FIG. 4 shows a side perspective view of assembly secured within fixture in accordance with the described embodiments.

FIG. 4 shows a side perspective view of assembly 200 secured within fixture 300. Fixture 300 can secure assembly 200 using a clamping mechanism acting on metal frame 106. Moreover, rear portion 108 can be supported by a "nest" portion of fixture 300 (not shown). In this way, fixture 300 can provide support for assembly 200 during a subsequent laser welding operation. Once assembly 200 is secured by fixture 300, bar 202 can be secured to metal frame 106. In the described embodiment, the securing can be accomplished by, for example, laser tack welding at a junction of bar 202 and metal frame 106. In this way, once bar 202 is securely in place, assembly 200 can be placed in an appropriate orientation for subsequent processing. For example, laser welding bar 202 to metal frame 106 requires that a forging force be applied to bar 202 at a position and direction such that bar 202 deforms in relation to metal frame 106. This forging force can be applied by way of a pressing plate (not shown) that can be formed of tool steel or other appropriate material. Therefore, a most appropriate orientation for bar 202 is in the "face up" direction (or +Z direction) in order that the pressing plate generate sufficient downwardly applied force (i.e., −Z direction) to deform bar 202 onto metal frame 106. In some cases, at least some diffusion bonding between bar 202 and metal frame 106 can occur. Although not of a sufficient degree to forego laser welding, any diffusion bonding that does occur can enhance the bond created by laser welding. Other arrangements are possible depending, of course, on the particular set up to be used, equipment, etc.

Figure 5:
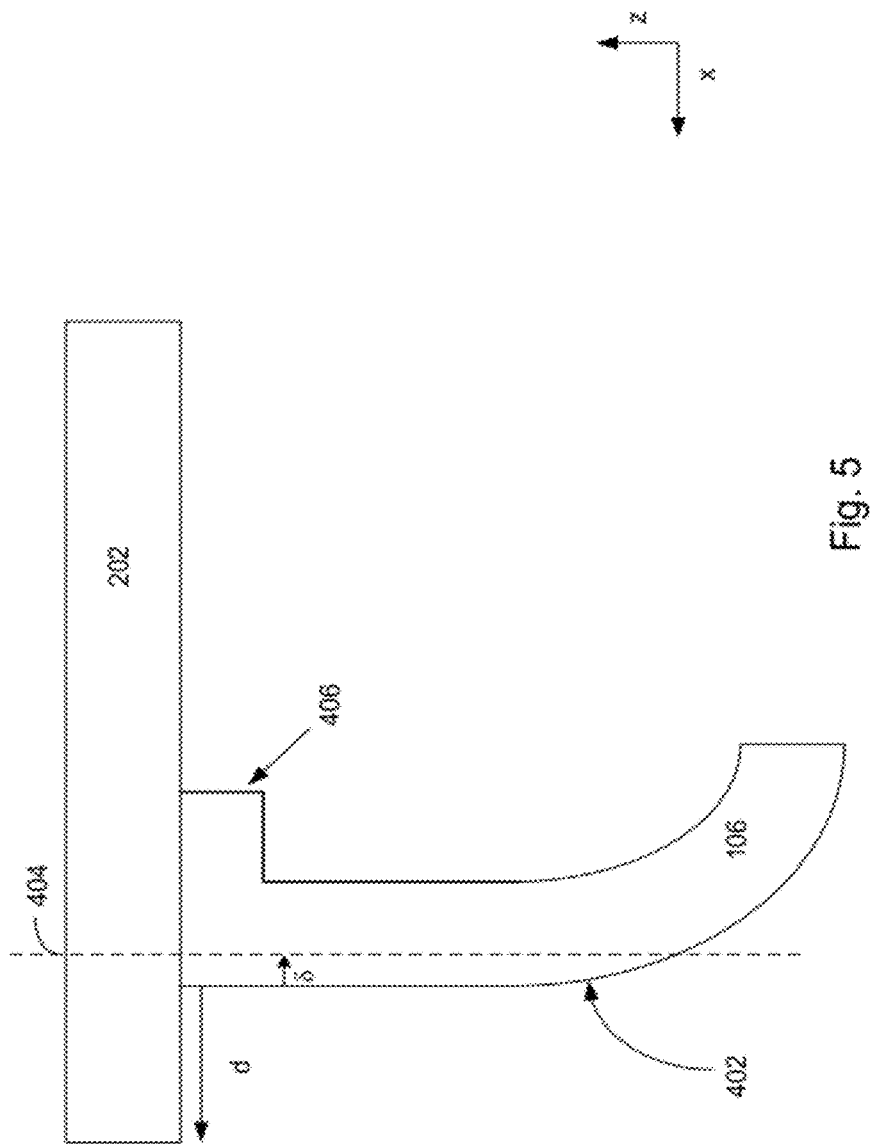
FIG. 5 shows a close up cut away view of a portion of junction area shown in FIG. 4 at a line A-A.

In order to more clearly demonstrate the details of the fabrication operation, FIG. 5 shows a close up cut away view of a portion of junction area 400 shown in FIG. 4 at a line A-A. As shown, bar 202 can extend along the X axis distance "d" from exterior wall 402 of housing 106 in order to accommodate post weld finishing operations without exposing the weld nugget (referred to as blow-through). For example, post weld finishing operations can include removing portion δ of metal frame 106 (in addition to a portion corresponding to distance d of bar 202) exposing a new, finished surface corresponding to, for example, dotted line 404. Removal of this material can assist in producing an apparently seamless joint between metal frame 106 and bar 202 when viewed by an outside observer. However, due to the high aspect ratio of a keyhole weld nugget created during the laser weld operation, sacrificial portion 406 can be used to prevent any artifacts related to the weld nugget formed during the laser welding operation from being exposed on the finished surface.

Figure 6:
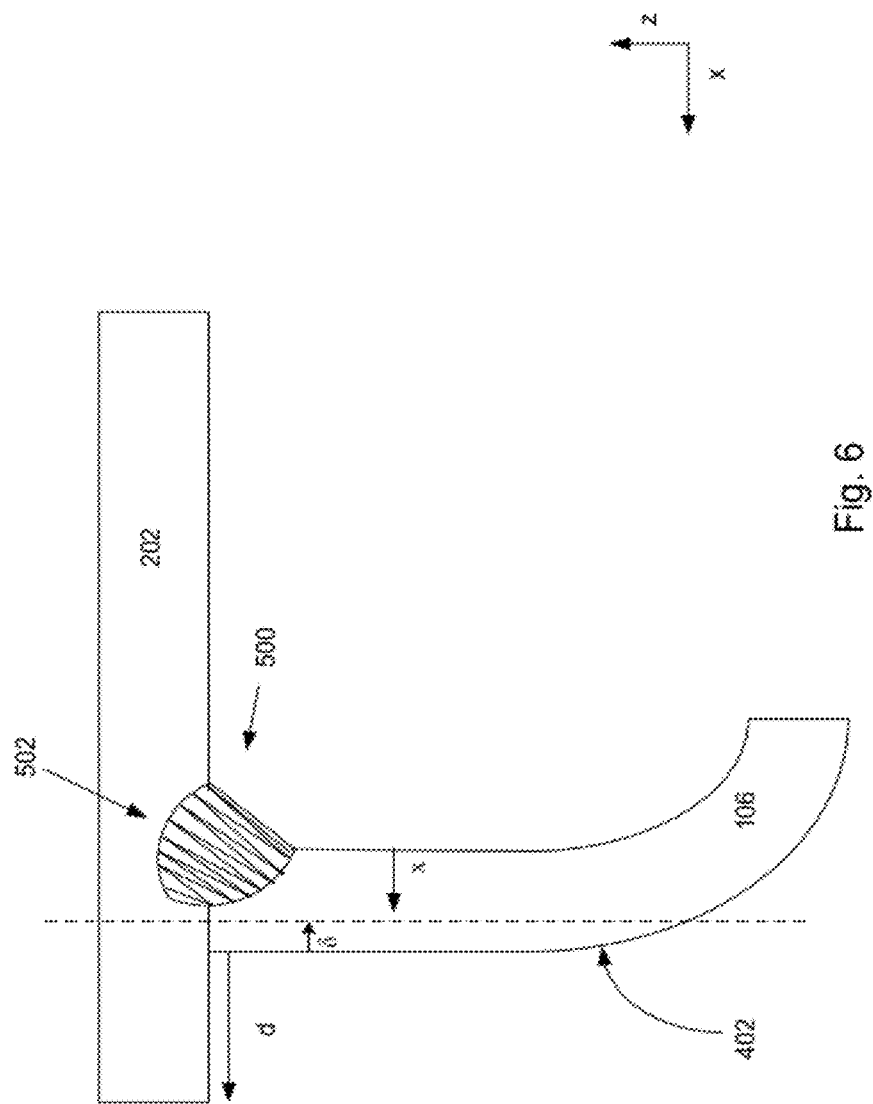
FIG. 6 shows representative keyhole weld having weld nugget that forms the actual weld in accordance with the described embodiments.

FIG. 6 shows representative keyhole weld 500 having weld nugget 502 that forms the actual weld. Weld nugget 502 can be formed of cooled metal that had been liquefied/vaporized by the laser as the laser energy bounced around within the keyhole cavity formed in region targeted by the laser. In order to prevent exposing weld nugget 502 during subsequent machining operations, the laser target area includes sacrificial portion 406 having dimensions that can be on the order of about 10% to about 50% thickness as metal frame 106. Keyhole weld 500 can have a high aspect ratio (at least in the range of 1.1 to about 1.125) and as a result weld nugget 502 can extend a distance x into the surface of the junction of metal frame 106 and bar 202. Depending upon the desired location of the finished surface (i.e., the value of δ) it is important that substantially none of weld nugget 502 be exposed. Therefore, by having the laser include sacrificial portion 406 in its target area, it can be expected that the probability of exposing weld nugget 502 during subsequent finishing operations can be low enough to be within an acceptable range of probability. Once the bar 202 and metal frame 106 have been welded together, assembly 200 can be removed from fixture 300 and any of a number of post welding finishing operations can be performed. These finishing operations can include, for example, using CNC machining techniques to shape housing 100 into a form suitable for enclosing the computer/display assembly and/or placing the protective glass.

Figure 7:
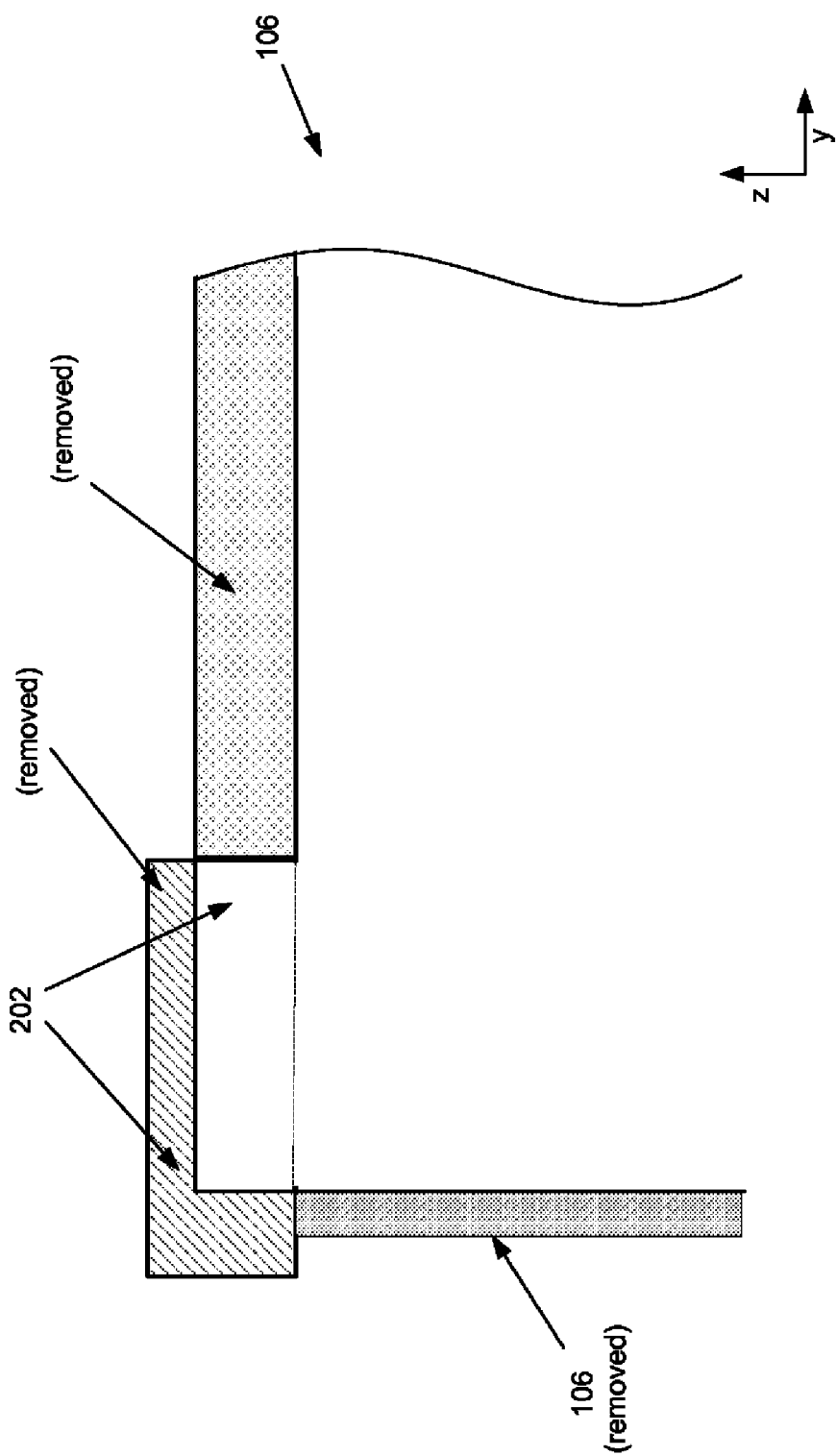

FIGS. 7 and 8 show results of representative finishing operations in accordance with the described embodiments. For example, FIG. 7 illustrates a process of removing selected portions of bar 202 to form chin 110. Moreover, in order to accommodate the protective glass layer, selected portions of frame 106 can be removed. In this way, as shown in FIG. 8, chin 110 can act as a shelf onto which the protective glass layer can rest supported by glass restraints 112 appropriately located on metal frame 106. Other finishing operations can include forming a protective layer on the surface of housing 100 after the mechanical finishing operations have been completed. The protective layer can be an oxide layer that can improve its appearance, durability, wear and corrosion resistance. In addition, the oxide layer can obscure any remaining visible weld artifacts on the surface of the housing. If the metal is aluminum other suitable material, this protective and cosmetic layer can be formed during an anodizing process.

FIG. 9A shows a portion of representative laser welding assembly 900 in accordance with the described embodiments. Generally speaking, the laser and the shield gas go through the same housing. The laser then goes through the cover glass the shield gas is channeled around it before both are shot through a nozzle that guides the shield gas to the welding location and protects the shield gas from spatter. In the particular embodiment shown in FIG. 9A, laser welding assembly 900 includes cover glass holder 904. Laser beam 906 can be directed to desired target area 908. Cover glass 910 provides a protective shield from any debris generated by the welding process. In order to prevent unwanted reactions (such as oxidation, or other chemical reactions) from occurring in target area 908, shield gas can be directed by nozzle 912 to provide atmosphere 914 of inert gas (such as Ar) in target area 908. However, since laser welding assembly 900 must be operate within the close confines of bar 202 and body 106, laser welding assembly 900 and therefore cover glass 910 must also be placed in close proximity to target area 908 thereby substantially increasing the likelihood of debris 916 (also referred to as dross or blowback or spatter) blowing back onto cover glass 910 resulting in reduced laser energy supplied to target area 908 (and subsequently reducing the quality of the weld itself). Conventional thought has it that cross jet 918 that can provide cross jet flow 920 (usually of high pressure compressed air) will deflect debris from target area 908 and in the process reduce the amount of impurities deposited on cover glass 908.

Figure 9B:
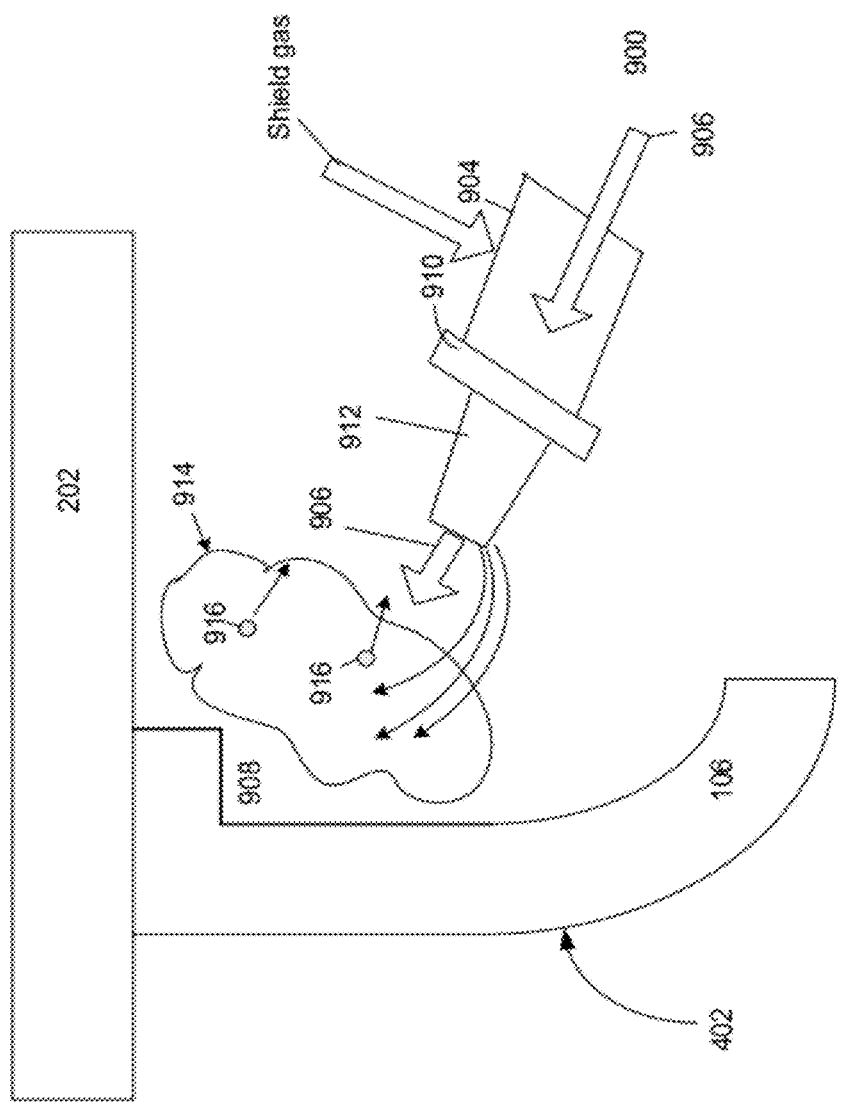

Unfortunately, during the actual laser welding operation it was found that the lifetime of cover glass 910 was substantially reduced over that which would be expected even with the deflection caused by cross jet flow 920. It was discovered, however, that high pressure cross jet flow 920 was apparently creating region L of relatively low pressure near nozzle 912. This region of low pressure had the effect of drawing off some of the inert gas provided by nozzle(s) 912 to target area 908 as well as directly from nozzle 912. This reduction in inert gas atmosphere and creation of a low pressure region had the effect of generating a greater amount of spatter, funneling said spatter directly at cover glass 910 at an increased rate of speed, and creating an inconsistent weld nugget. In other words, cross jet flow 920 meant to preserve the lifetime of cover glass 910 actually had the opposite effect and created an unstable welding process overall. Therefore, contrary to conventional wisdom, turning off cross jet flow 920 (and removing cross jet 918) as shown in FIG. 9B improved the lifetime of cover glass 910 by eliminating the region of low pressure that, in turn, returned the inert atmosphere in target area 908 to appropriate levels.

Figure 10:
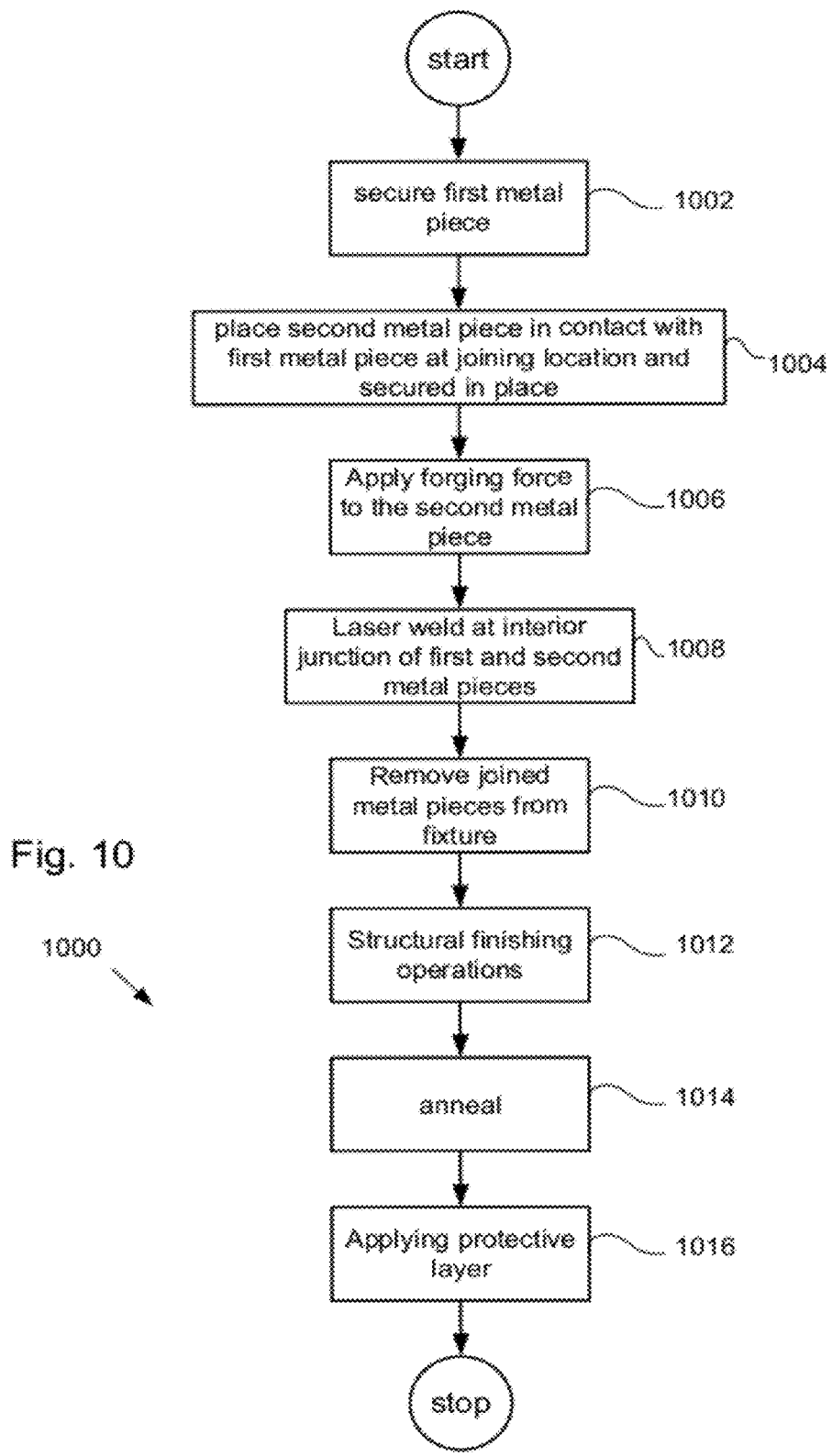
FIG. 10 shows a flowchart detailing process for joining at least two pieces of metal by a weld that can be essentially invisible to an observer.

FIG. 10 shows a flowchart detailing process 1000 for joining a first piece of metal and a second piece of metal by an apparently seamless weld that can be essentially invisible to an observer. Process 1000 can begin at 1002 by securing a first piece of metal. In the context of a computer housing, the first piece of metal can take the form of a housing having a metal frame and a rear portion each secured within a fixture. The second piece of metal can take the form of a metal bar. In the described process, the metal frame can be formed of aluminum and be used to support a computer/display assembly whereas the rear portion can enclose a volume suitable for accommodating and protecting the computer/display assembly from the external environment. In the described process, the securing can include clamping the metal frame by the fixture and nesting the rear portion in a nest portion of the fixture. Next at 1004, a second piece of metal (that can take the form of the metal bar) can be placed in contact with the first piece of metal (that can take the form of the housing) and secured in place. In the described embodiment, the metal bar can be placed on and secured to a front portion of the metal frame. The securing can be accomplished by tack welding the metal bar to the metal frame or using small mechanical clamps. Next at 1006, a full clamping force (also referred to as forging force) can be applied to the second metal piece. The forging force can cause the second metal piece to physically deform in relation to the first metal piece. Primarily, the forging force can produce a tight fit up between the metal bar and the metal frame. Secondarily, the forging force can cause at least some diffusion bonding to occur between the metal bar and the metal frame.

At 1008, a laser weld can be formed at an interior junction area of the metal bar and the metal frame. A sacrificial lip in the junction region can be used as a target for the laser. In this way, the weld nugget formed by the laser is sufficiently removed from an opposite wall of the metal frame to essentially eliminate the possibility of exposing the weld nugget during any post weld finishing operations. At 1010, the assembly formed of the joined first and second metal pieces is removed from the fixture and at 1012 structural finishing operations are performed. The structural finishing operations can include machining operations such as CNC machining operations used to bring the exterior dimensions of the assembly to within a specified range of values. The machining operations can also be used to provide features such as a ledge used to support a display protective glass layer. At 1014, an annealing is performed to relieve any stress related defects. At 1016, applying protective layer. The hiding can be accomplished by, for example, texturing the surface using a cleaning operation such as abrasive blasting. Abrasive blasting can prepare a surface by forcibly propelling a stream of abrasive material against it under high pressure thereby making the surface smoother, remove surface contaminants or in some cases to roughen the surface. Once the surface has been properly prepared, the surface can be anodized in order to improve its appearance, durability, wear and corrosion resistance. In addition, the oxide layer formed can obscure any remaining visible weld artifacts on the surface of the housing. It should be noted that the anodizing process was optimized to hide the seam as much as possible and reduce any color variation between the two parts.

The various aspects, embodiments, implementations or features of the invention can be used separately or in any combination. The invention can be implemented by software, hardware or a combination of hardware and software. The invention can also be embodied as computer readable code on a computer readable medium for controlling a laser welding apparatus. The invention can be embodied as computer readable code on a computer readable medium for controlling a manufacturing line used to fabricate housings. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that an apparently seamless joint can be formed between at least two metallic work pieces. The apparent seamless joint can enhance an overall look and feel of a consumer product such as a computer housing. The many features and advantages of the present invention are apparent from the written description and, thus, it is intended by the appended claims to cover all such features advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of joining a first piece of metal and a second piece of metal comprising:
    placing the first piece of metal in contact with the second piece of metal forming a junction area;
    applying a forging force to the first piece of metal, the forging force having an effect of creating an extremely tight fit up between the first and the second pieces of metal;
    forming an assembly by welding the junction area to form a weld, the weld being essentially invisible to an observer, the assembly including the joined first and second pieces of metal; and
    forming a cosmetically enhancing protective layer on the surface of the assembly, the protective layer obscuring any visible artifacts on the surface of the assembly, the obscured visible artifacts including any discoloration or discontinuity created by the welding.

2. The method as recited in claim 1, wherein the weld is a laser weld, and wherein the first and the second pieces of metal undergo at least some diffusion bonding due to the applying of the forging force.

3. The method as recited in claim 1, wherein the first piece of metal is an aluminum bar and wherein the second piece of metal is an aluminum frame.

4. The method as recited in claim 3, wherein the assembly is a computer housing used to enclose and support a computer/display assembly.

5. The method as recited in claim 4, wherein the forming the protective layer comprises;

cleaning the surface of the computer assembly; and
anodizing the cleaned surface.

6. A computer housing, comprising:
   a metal frame; and
   a metal bar, the metal bar and the metal frame joined together at an essentially invisible weld joint to form the computer housing, the essentially invisible weld formed by
   fixturing the metal frame,
   placing the metal bar onto the fixtured metal frame to form a junction region,
   applying a forging force onto the metal bar that causes at least a portion of the metal bar in contact with the metal housing to physically deform in relation to the metal frame at the junction region,
   forming the computer housing by welding the junction region using the sacrificial lip as the laser target; and
   forming a protective layer on the computer housing, the protective layer hiding from view surface defects caused by the laser welding.

7. The computer housing as recited in claim 6, wherein the weld joint is formed by laser welding and wherein the metal housing and the metal bar are aluminum.

8. The computer housing as recited in claim 7, wherein the protective layer is formed by,
   cleaning an exposed surface of the assembly at least in the region of the laser welding; and
   anodizing the cleaned surface.

9. A method of laser welding a first and a second piece of metal together in a small enclosed area, comprising:
   providing the laser welding apparatus, the laser welding apparatus having at least a protective cover glass;
   in the absence of a cross jet flow,
      providing an atmosphere of inert gas in the vicinity of a laser target; and
      firing the laser at the laser target, wherein the absence of the cross jet flow preserves the inert atmosphere of inert gas in the vicinity of the laser target thereby substantially reducing an amount of laser caused debris from reaching the cover glass, thereby extending a useful life of the cover glass.

10. The method as recited in claim 9, wherein the laser welding apparatus does not include a cross jet flow nozzle.

11. The method as recited in claim 9, wherein the cross jet flow is turned off.

12. The method as recited in claim 9, wherein the inert gas is Argon.

13. Computer readable medium for encoding computer program code executable by a processor, the processor controlling a laser welding operation for joining a first piece of metal and a second piece of metal, the computer readable medium comprising:
   computer code for placing the first piece of metal in contact with an edge of the second piece of metal, the sacrificial lip and the first piece of metal forming a junction area;
   computer code for applying a forging force to the first piece of metal, the forging force having an effect of creating an extremely tight fit up between the first and the second pieces of metal;
   computer code for forming an assembly by laser welding the junction area that includes the sacrificial lip to form a laser weld, the laser weld being essentially invisible to an observer, the assembly including the joined first and second pieces of metal; and
   computer code for forming a cosmetically enhancing protective layer on the surface of the assembly, the protective layer obscuring any visible artifacts on the surface of the assembly, the obscured visible artifacts including any discoloration or discontinuity created by the laser welding.

14. The computer readable medium as recited in claim 13, wherein the edge of the metal includes a sacrificial lip, and wherein the first and the second piece of metal undergo at least some diffusion bonding due to the applying of the forging force.

15. The computer readable medium as recited in claim 13, wherein the first piece of metal is an aluminum bar and wherein the second piece of metal is an aluminum frame.

16. The computer readable medium as recited in claim 15, wherein the assembly is a computer housing used to enclose and support a computer/display assembly.

17. The computer readable medium as recited in claim 16, wherein the forming the protective layer comprises;
   cleaning the surface of the computer assembly; and
   anodizing the cleaned surface.

* * * * *

UNITED STATES PATENT AND TRADEMARK OFFICE
CERTIFICATE OF CORRECTION

| | | |
|---|---|---|
| PATENT NO. | : 8,338,737 B2 | Page 1 of 1 |
| APPLICATION NO. | : 12/571122 | |
| DATED | : December 25, 2012 | |
| INVENTOR(S) | : Carlo Catalano et al. | |

It is certified that error appears in the above-identified patent and that said Letters Patent is hereby corrected as shown below:

In the Claims

Column 10, lines 51-52 (Claim 1, lines 13-14): "the surface" should read -- a surface --.

Column 11, line 1 (Claim 5, line 3): "the computer assembly;" should read -- the assembly; --.

Column 11, line 7 (Claim 6, line 5): "invisible weld formed" should read -- invisible weld joint formed --.

Column 11, lines 13-14 (Claim 6, lines 11-12): "metal housing" should read -- computer housing --.

Column 11, line 17 (Claim 6, line 15): "the sacrificial lip as the laser" should read -- a sacrificial lip as a laser --.

Column 11, lines 22-23 (Claim 7, lines 2-3): "metal housing" should read -- computer housing --.

Column 11, line 26 (Claim 8, line 3): "the assembly" should read -- the computer housing --.

Column 11, line 31 (Claim 9, line 3): "providing the laser" should read -- providing a laser --.

Column 11, line 34 (Claim 9, line 6): "the vicinity" should read -- a vicinity --.

Column 12, lines 11-12 (Claim 13, lines 7-8): "the sacrificial lip" should read -- a sacrificial lip --.

Column 12, line 23 (Claim 13, line 19): "the surface" should read -- a surface --.

Column 12, line 41 (Claim 17, line 3): "the computer assembly;" should read -- the assembly; --.

Signed and Sealed this
Second Day of June, 2015

Michelle K. Lee
*Director of the United States Patent and Trademark Office*